(12) United States Patent
MacDougall

(10) Patent No.: US 9,688,413 B2
(45) Date of Patent: Jun. 27, 2017

(54) GROUND PROXIMITY CONTROL FOR AIRCRAFT ENGINES

(75) Inventor: James MacDougall, Scottsdale, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 2348 days.

(21) Appl. No.: 10/794,471

(22) Filed: Mar. 5, 2004

(65) Prior Publication Data
US 2005/0194494 A1 Sep. 8, 2005

(51) Int. Cl.
*B64D 31/00* (2006.01)
*F02C 9/00* (2006.01)

(52) U.S. Cl.
CPC ............... *B64D 31/00* (2013.01); *F02C 9/00* (2013.01); *F05D 2260/80* (2013.01)

(58) Field of Classification Search
USPC ..... 244/76 B, 180, 182, 188, 186, 194, 195; 701/5, 8
See application file for complete search history.

(56) References Cited

U.S. PATENT DOCUMENTS

| 2,930,035 A * | 3/1960 | Altekruse ...................... 342/65 |
| 2,965,884 A | 12/1960 | La Patka et al. |
| 2,984,069 A | 5/1961 | Saville et al. |
| 3,051,416 A * | 8/1962 | Rotier ........................... 244/191 |
| 3,591,110 A * | 7/1971 | Dramer et al. ................ 244/188 |
| 4,500,966 A * | 2/1985 | Zagranski et al. ............ 701/116 |
| 4,924,401 A * | 5/1990 | Bice et al. ........................ 701/6 |
| 5,337,982 A * | 8/1994 | Sherry .......................... 244/186 |
| 5,836,546 A * | 11/1998 | Gast ............................ 244/76 B |
| 6,224,021 B1 | 5/2001 | Tanaka |
| 6,450,456 B1* | 9/2002 | Greene ......................... 244/186 |

* cited by examiner

*Primary Examiner* — Tien Dinh
(74) *Attorney, Agent, or Firm* — Lorenz & Kopf, LLP

(57) ABSTRACT

A system and method are provided for controlling the power setting of an aircraft engine when the current height-above-terrain (HAT) value Hc is less then a predetermined minimum H(min). The system includes a ground proximity unit (GPU) for measuring Hc, one or more sensors coupled to the engine for detecting an out-of-range operating condition of the engine, an engine control unit (ECU) coupled to the GPU and the one or more sensors and the engine, for controlling operation of the engine in response to Hc, H(min) and the engine operating values. When the one or more sensors detects an out-of-range operating condition normally curable by reducing the engine power setting, the ECU is prevented from automatically reducing the power setting of the engine if Hc<H(min). No pilot action is required.

14 Claims, 2 Drawing Sheets

GROUND PROXIMITY CONTROL FOR AIRCRAFT ENGINES

FIELD OF THE INVENTION

The present invention relates to aircraft engine controls and, more particularly, to aircraft engine controls that consider ground proximity.

BACKGROUND OF THE INVENTION

It is known in the art of aircraft engine control to use various computerized systems to aid in navigation, flight control and engine management. These systems may include, for example, various warning systems, ground proximity systems, engine control systems, and aircraft control systems, just to name a few. Warning systems help the aircraft to continue to operate under safe conditions or to avoid entering an unsafe operating condition or avoid ground obstacles. Ground proximity systems may warn of approaching obstacles or automatically adjust autopilot settings to avoid them. Engine control systems may adjust fuel flow and other operating conditions in response to changes in air pressure and other variables. Aircraft control systems may inhibit certain maneuvers that might result in undesired operation. Engine control systems may adjust engine operation in the highly unlikely event of an engine failure in a multi-engine aircraft.

While each of the above-mentioned systems is useful, they may not adequately deal with other conditions that can adversely affect operation of an aircraft. Of particular concern is control of the engines when the aircraft drifts out of its normal operating envelope, in particular when approaching ground obstacles that may place it below a predetermined altitude threshold and an engine out-of-range condition occurs, especially a condition that would prompt the engine control system to automatically decrease an engine throttle setting to avoid engine damage. Thus, there continues to be a need for improved engine control systems coupled with a ground proximity system that adjusts the engine operating envelope to preclude an engine control system from aggravating a prospective or actual departure from safe altitude operation. In addition, it is desirable that the ground proximity system and engine control system interact automatically without requiring pilot observation or intervention. Furthermore, other desirable features and characteristics of the present invention will become apparent from the subsequent detailed description and the appended claims, taken in conjunction with the accompanying drawings and the foregoing technical field and background.

SUMMARY OF THE INVENTION

The present invention provides a system and method for controlling the power setting of an aircraft engine when the current height-above-terrain (HAT) value Hc is less then a predetermined minimum H(min). The system includes a ground proximity unit (GPU) for measuring Hc, one or more sensors coupled to the engine for detecting an out-of-range operating condition of the engine, an engine control unit (ECU) coupled to the GPU, the one or more sensors and the engine, for controlling operation of the engine in response to Hc, H(min) and the engine operating values. When the one or more sensors detects an out-of-range operating condition normally curable by reducing the engine power setting, the ECU is prevented from automatically reducing the power setting of the engine if Hc<H(min). No pilot action is required.

In one embodiment, and by way of example only, the sensors measure engine operating temperature T. When T>Tc where Tc is a predetermined critical value above which engine operation is not desirable, the ECU would normally automatically reduce the engine power setting in order to correct the over-temperature problem. The present invention prevents this automatic power reduction response to the T>Tc condition if Hc<H(min). This operation is entirely automatic and does not require pilot or other flight crew action. While Hc<H(min), the ECU causes the engine to maintain its current thrust output unless the pilot alters the engine control settings.

Other independent features and advantages of the preferred embodiments will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
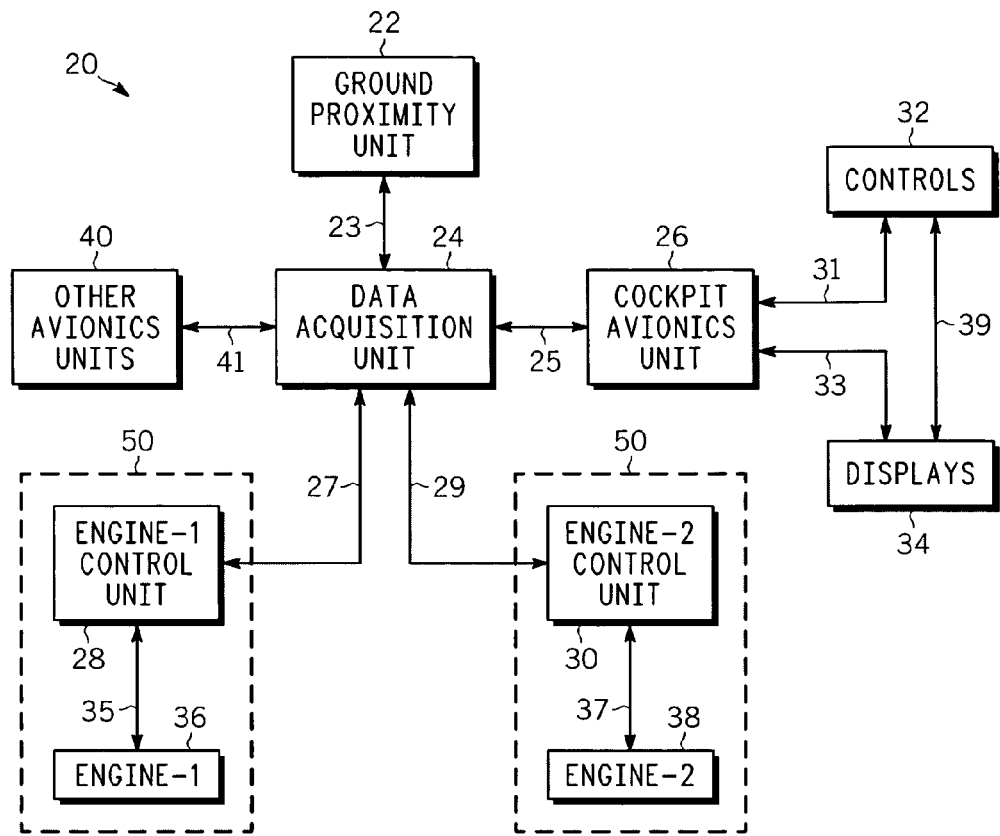
FIG. 1 is a simplified electrical schematic diagram of an aircraft avionics system according to the present invention.

FIG. 1 is a simplified electrical schematic diagram of overall aircraft avionics system 20 according to the present invention. System 20 desirably comprises ground proximity unit (GPU) 22, data acquisition unit (DAU) 24, cockpit avionics unit (CAU) 26 with aircraft controls 32 and displays 34, engine controls units (ECUs) 28, 30 and other avionics units (OAUs) 40. Ground proximity unit (GPU) 22 periodically or continually measures the aircraft height (e.g., by radar) above the local terrain in lookdown and/or lookahead modes. In a preferred embodiment, GPU 22 also includes electronic maps of the area above which the aircraft is flying so that the radar returns may be correlated with approaching terrain features. While a terrain-following radar is preferred for GPU 22, this is not essential and other means of providing height-above-terrain (HAT) information may also be used. Non-limiting examples include, but are not limited to, a satellite based global positioning system (GPS) combined with digitally stored local terrain maps having feature elevation data, or a simple proximity sensor. Any suitable means of providing height-above-terrain (HAT) data may be used and is intended to be included in the words "ground proximity unit" and the abbreviation "GPU". GPU 22 sends height-above-terrain (HAT) information via bus or link 23 to data acquisition unit (DAU) 24.

Cockpit avionics unit (CAU) 26 receives pilot initiated commands from controls 32, for example, flight control column and pedal movements, switch settings, and the like, via bus or link 31. CAU 26 sends data to display 24 via bus or link 33 where navigation, flight and aircraft status information are displayed. Controls 32 and displays 34 are also conveniently but not essentially directly coupled by bus or link 39. Flight controls 32, display 34 and CAU 26 are conventional. CAU 26 sends data on flight status, navigation, control positions and other cockpit related information via link or bus 25 to DAU 24.

Engine control units (ECUs) 28, 30 provide computer based management of engines 36, 38 respectively. ECUs 28, 30 are coupled to DAU 24 by links or buses 27, 29 and to engines 36, 38 by links or buses 35, 37 respectively. Further details of engine subsystems 50 are provide in FIG. 2. Other avionics units (OAUs) 40 are coupled to DAU 24 by links or bus 41. OAUs 40 provide inputs concerning other flight and aircraft operating parameters, as for example, and not intended to be limiting, radio communication, cabin pressure and temperature, entertainment systems, etc. OAUs 40 are conventional.

DAU 24 is a central data transceiver that receives data from GPU 22, CAU 26, ECUs 28, 30 and OAUs 40 shares it among the various elements of overall system 20 as needed by the individual elements. For example, height-above-terrain (HAT) data generated by GPU 22 is transferred to DAU 24 where it can be read by engine ECUs 28, 30. Similarly, minimum predetermined HAT limits H(min) entered by the pilots via controls 32 or stored in a route navigation computer in CAU 26 in one of OAUs 40 or in ECUs 28, 30 is passed to DAU 24 where it can be read by ECUs 28, 30. Thus, DAU 24 facilitates overall control of the aircraft by receiving information being generated by various subsidiary avionics elements (e.g., GPU 22, CAU 26, OAUs 40, ECUs 28, 30, etc.) and making this data or information available to other subsidiary avionics elements that have need thereof. Persons of skill in the art will understand based on the description herein and knowledge of modern aircraft systems, how such function is performed. While only two ECUs 28, 30 and engines 36, 38 are shown in FIG. 1, this is merely for simplicity of explanation and persons of skill in the art will understand based on the description herein that any number of engines and engine control units can be used.

Figure 2:
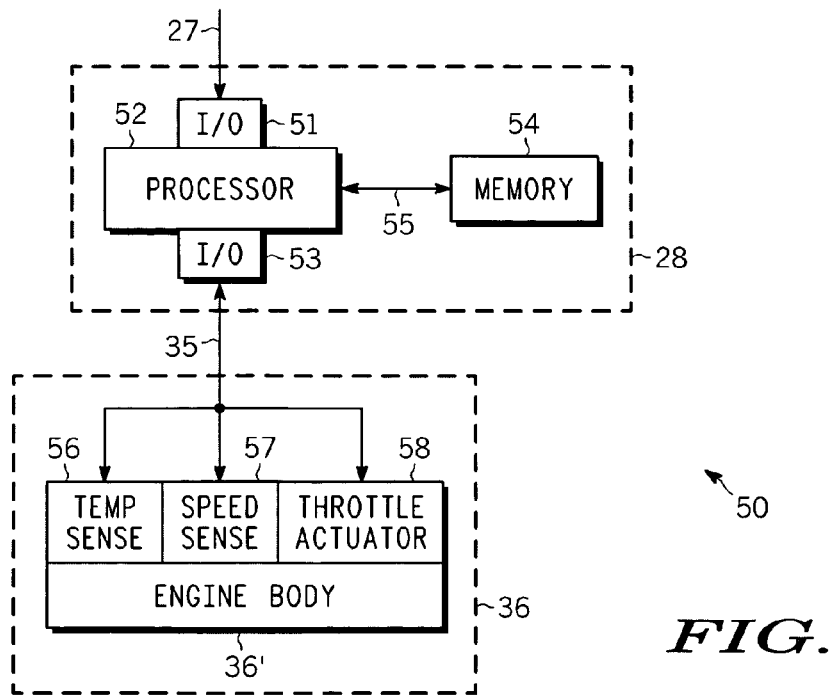
FIG. 2 is a simplified electrical schematic diagram of an engine and engine control unit combination according to the present invention.

FIG. 2 is a simplified electrical schematic diagram of representative engine subsystem 50 according to the present invention showing further detail. Subsystem 50 applies to both ECU-engine combinations 28, 36 and 30, 38 and any others where more than two engines are used. Subsystem 50 comprises ECU 28 and engine 30 (or corresponding ECUs and engines for other units). ECU 28 comprises processor 52, associated I/Os 51, 53 and memory 54. I/O 51 receives data from DAU 24 over link or bus 27 as previously explained. Memory 54 is coupled to processor 52 by link of bus 55. Processor 52 is coupled to engine 36 through I/O 53 and link or bus 35. I/O 53 includes the drivers, level shifters and other interface circuits required to couple processor 52 to engine 36. Engine 36 comprises temperature sensors 56 (abbreviated as "TEMP SENSE"), power or speed sensor 57 (abbreviated as "SPEED SENSE"), and throttle actuator 58, coupled to I/O 53 by leads or bus 35. While a single bus 35 is shown as coupling sensors 56, 57 and actuator 58 to processor I/O 53, this is merely for convenience of explanation and persons of skill in the art will understand that separate leads or buses may be used to couple temperature sensors 56, power or speed sensor 57 and actuator 58 to processor I/O 53. Sensors 56, 57 and actuator 58 are often mounted directly on engine body 36', but this is not essential. While ECU 28 is shown as being separate from engine 36 this is not essential and it is often the case that ECU 28 is also directly mounted on engine 36. Either arrangement is useful. What is important is that ECU 28 be able to receive HAT information via bus 27 or equivalent from GPU 22 and engine temperature and engine power output (i.e., engine speed) values over lead or bus 35 or equivalent from sensors 56, 57 and be able to control the throttle settings of engine 36 via leads or bus 35 or equivalent to actuator 58. The operation of system 20 and sub-system 50 will be more fully understood in connection with FIG. 3. As used herein the word 'throttle' is intended to refer to any arrangement for controlling engine power output and not be limited merely to intake air modulation nor to any particular engine type. For example, and not intended to be limiting, the present invention applies to jet engines, turbo-fan engines, reciprocating engines, rotary engines, etc., that is, any engine whose power output can be controlled. Non-limiting examples, of various ways of controlling engine power output are, ignition advance or retard, fuel flow, fuel injection timing and amount and fuel mixture. Any means of controlling engine power output can be used and is intended to be included in the present invention. Further, the words "out-of-range condition" are intended not to be limiting merely to the examples given herein, but to refer to any engine operating condition that departs from normal operating parameters under the circumstances. Non-limiting examples of out-of-range conditions are engine temperature T exceeding a predetermined temperature $T_c$, engine speed S falling below a predetermined level $S_c$, fuel line pressure falling below a predetermined critical value $FP_c$, and so forth.

Figure 3:
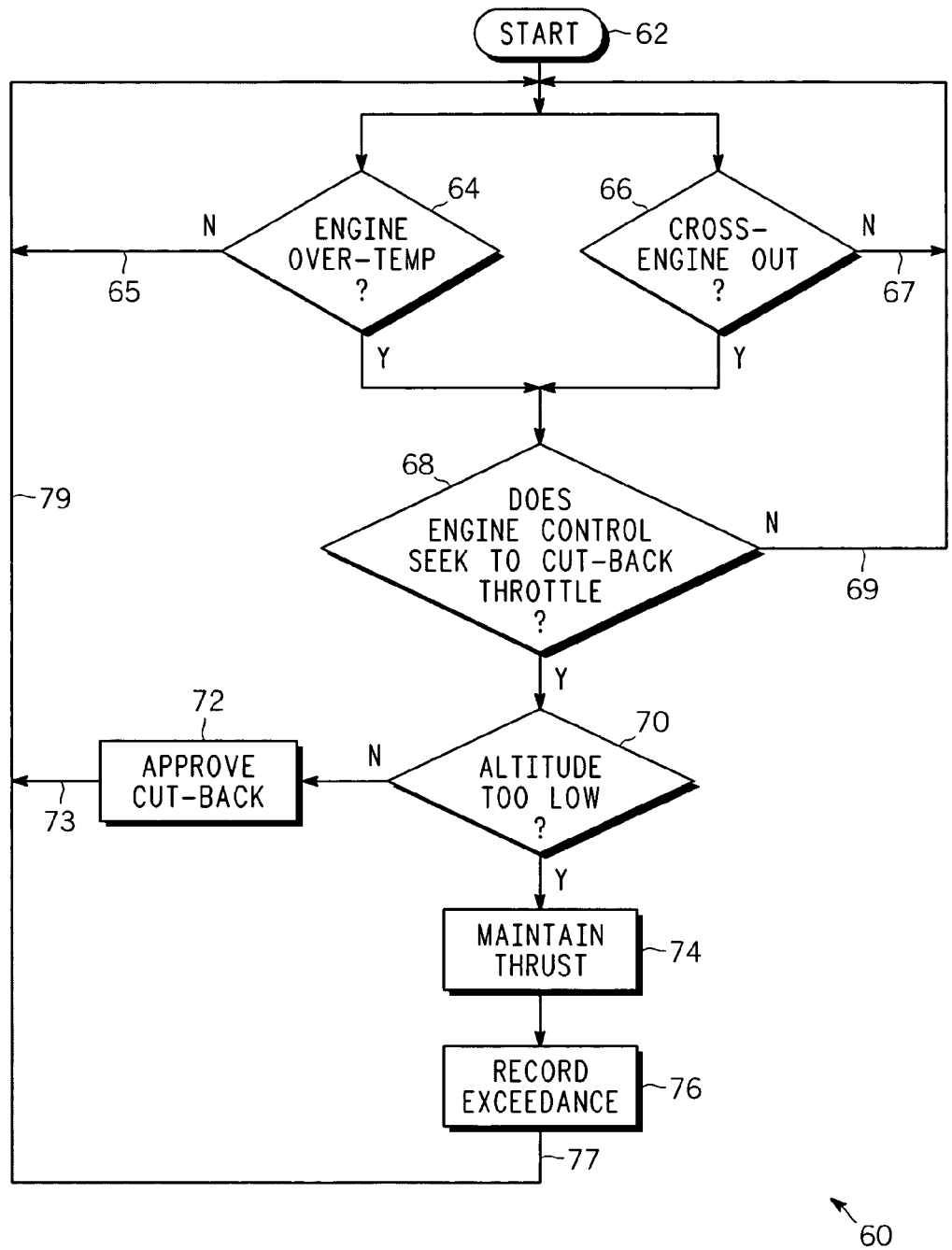
FIG. 3 is a simplified flow chart of the method of the present invention.

FIG. 3 is a simplified flow chart of method 60 of the present invention. Method 60 is preferably executed by system 20 and sub-system 50 of FIGS. 1-2, but other hardware combinations capable of executing the steps of method 60 are also useful and are not excluded. For convenience of explanation, method 60 is described for the operation of engines 36, 38 it being understood that other engine controllers execute the same steps with respect to their engines, depending upon the local circumstances. Also, for convenience of explanation, it is assumed that processor 52 of ECU 28 in conjunction with memory 54 is performing the various logical steps of method 60, but this is not essential. A computer and memory located anywhere in overall avionics system 20 can be used, provided that it can communicate with ECU 28, engines 36, 38 and GPU 22. Thus, the words "controller" or "processor" or "processor 52" or "memory" or "memory 54" are not intended to be limited to merely the processor or controller and memory implementing ECU 28, but to refer generally to whatever processor and memory in system 20 have been assigned the task of implementing the method of the present invention. Further, the suffix "(s)" is used herein to indicate that one or more elements may be involved in the particular function discussed. For example and not intended to be limiting, the word "sensor(s)" indicates that there may be one or more sensors, the word "actuator(s)" indicates that there may be one or more actuators, and so forth.

Method 60 begins with START 62 that conveniently occurs on engine start-up. When engine 36 is operating, temperature sensor(s) 56 and speed sensor(s) 57 continually or periodically report important engine temperature and speed readings to processor 52 where they are compared to critical values stored in memory 54 for the particular conditions of operation (e.g., outside air pressure and temperature, throttle position, exhaust temperature, etc.). Similarly, the equivalent of speed sensor(s) 57 in engine 38 also report to ECU 30 as to whether engine 38 is producing power. In turn, ECU 30 sends this data to DAU 24 where it is available to ECU 28 as "cross-engine" data.

Processor 52 executes ENGINE OVER-TEMP? query 64 wherein it determines whether or not the engine temperature(s) obtained from sensor(s) 56 confirm that engine 36 is operating at or below a predetermined temperature T=Tc. In general, Tc is the temperature above which engine operation is usually desired to be avoided. Processor 52 also executes CROSS-ENGINE OUT? query 66 wherein it is determined whether or not the opposing or "cross-engine" to engine 36 (e.g., engine 38) is producing power. If the outcome of both query 64 and 66 is NO (FALSE), indicating that Tc has not been exceeded and that the cross-engine is producing power, then method 60 loops back to START 62 as shown by paths 65, 67, and normal operation continues. Normal operation of course will depend upon the pilot throttle settings, altitude, outside air pressure and temperature and other factors routinely taken into account by ECU 28. These normal operating parameters are generally outside the scope of the present invention. When the cross-engine (e.g., engine 38) is not producing normal power, this will likely result in a greater demand on the remaining engine (e.g., engine 36), resulting in higher operating temperatures as ECU 28 tries to extract more power from engine 36 to compensate for the low power output from engine 38. While this discussion assumes a two-engine aircraft, persons of skill in the art will understand based on the description herein that any number of engines can be used. Where more than two engines are used, then CROSS-ENGINE OUT? query 66 desirably applies to all the other engines.

If the outcome of either query 64 or 66 is YES (TRUE) indicating that temperature Tc is being exceeded or that engine 38 is not producing significant power (i.e., it is "OUT"), then query 68 is executed. In query 68 it is determined whether or not ECU 28 in normal operation would seek to cut back the current throttle settings so as to avoid an undesired operating condition. For example and not intended to be limiting, when ECU 28 detects an engine over-temperature condition (i.e., T>Tc), then ECU 28 ordinarily seeks to reduce or cut-back the throttle setting of engine 36 so as to reduce engine power output in the expectation that this will result in an engine temperature reduction. The purpose of query 68 is to anticipate a throttle cut-back generally before it is carried out. This is conveniently accomplished, for example, by interrupting the normal ECU control process flow so that step 70 can be carried out before proceeding with the throttle cut-back, or adding step 70 as a further condition precedent to the execution of a throttle cut-back. If the outcome of query 68 is NO (FALSE) indicating the ECU has not reached a "cut-back throttle" decision, for whatever reason, then method 60 returns to START 62 as indicated by path 69. Because of the complexity of engine operation under a wide variety of conditions, there may be cases where ECU 28 does not reach a "throttle back" decision even though engine temperature temporarily exceeds Tc. In that situation as well as when T<Tc, the present invention does not interfere with normal operating conditions.

If the outcome of query 68 is YES (TRUE) indicating that system 20 would otherwise seek to reduce the throttle setting of the affected engine, then ALTITUDE TOO LOW? query 70 is executed, wherein it is determined using data from GPU 22 whether or not the current height-above-terrain (HAT) value Hc is below a predetermined minimum height H(min) set by the flight crew or the flight plan. H(min) can be stored in memory 54 or elsewhere in system 20 and the comparison to H(min) performed by processor 52. The storage location of the H(min) value is not critical provided that it is available for comparison to the current HAT value Hc either by processor 52 or equivalent elsewhere in system 20. Alternatively and not intended to be limiting, H(min) can be stored in GPU 22 (or elsewhere) and continually or periodically compared to the current HAT Hc determined by GPU 22, and only the error condition Hc<H(min) reported to ECU 28. Either arrangement is useful.

If the outcome of query 70 is NO (FALSE) indicating that the current HAP value Hc is above H(min) then, the method 60 proceeds to APPROVE CUT-BACK step 72 wherein ECU 28 can proceed to reduce or cut-back on the throttle setting of engine 36 by moving actuator 58 in an appropriate manner. Following step 72, operation returns to START 62 and queries 64, 66 are re-executed during the next engine control cycle. In a typical aircraft engine control system, engine control cycles are repeated about every 5 to 25 milliseconds. Such time intervals are generally short compared to the rate of change of most aircraft operating parameters (e.g., engine temperature and speed, aircraft altitude, etc).

If the outcome of query 70 is YES (TRUE), indicating that Hc<H(min), then MAINTAIN THRUST step 74 is executed wherein ECU 28 is automatically prevented from reducing the power setting of engine 36, that is, ECU 28 now seeks to maintain the thrust being provided by engine 36. As a result of step 74, ECU 28 automatically elects to tolerate the ENGINE OVER-TEMP condition detected in step 64 even though it may result in undesirable operating conditions. It does this to avoid having the aircraft drift lower below the H(min) value set by the pilot or the flight plan. Following step 74, RECORD EXCEEDANCE step 76 is executed wherein the existence of an over-temp condition is entered into a maintenance data log (e.g., in memory 54) and a counter started (e.g., by processor 52) to measure the duration of the over-temp condition. Following step 76 operation returns to START 62 as shown by path 79 and queries 64, 66 are re-executed in conjunction with the next engine control cycle, as previously discussed. For example and not intended to be limiting, as long as queries 64, 68, 70 give yes (TRUE) outcomes, ECU 28 will attempt to maintain engine thrust even though the over-temp condition exists. This occurs automatically without any intervention or decision making by the pilot. The pilot may be alerted via display(s) 34 that the over-temp condition and/or the ECU over-ride (MAINTAIN THRUST) condition exists, but this is not essential. The present invention does not interfere with normal flight control functions. For example, if the pilot(s) or other flight crew operates controls 32 to reduce the requested power setting of the engine(s), as they might do when landing, then ECU 28 responds appropriately and reduces the throttle setting in the normal manner even though an over-temp condition exists. The action of the present invention is to prevent ECU 28 from independently and without pilot input, reducing the engine thrust under conditions where the aircraft is below a predetermined HAT threshold.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. For example, while the present invention has been described and implemented for "over-temp" or "cross-engine-out" conditions, it will be apparent from the description herein that it can also be applied to any out-of-range condition that would otherwise prompt a throttle cut-back or other power reduction response from the engine control system. Before proceeding with the otherwise indicated throttle cut-back or other power reduction, the current HAT value Hc is compared with the minimum HAT value H(min) set by the pilot(s) or other crew or the flight plan, and the cut-back or other power reduction aborted if Hc<H(min). Therefore, it is intended that the invention not be limited to the particular embodiment disclosed as the best mode contemplated for carrying out this invention, but that the invention will include all embodiments falling within the scope of the appended claims.

I claim:

1. A system for controlling the power setting of an aircraft engine, comprising:
    a ground proximity unit (GPU) for measuring current aircraft height-above-terrain (HAT) values Hc;
    one or more sensors coupled to the engine for detecting an out-of-range operating condition of the engine;
    an engine control unit (ECU) coupled to the GPU, the one or more sensors and the engine for controlling operation of the engine in response to Hc and engine operating values determined by the one or more sensors; and
    wherein, when the one or more sensors detects an out-of-range operating condition of the engine, which out-of-range operating condition of the engine is normally curable by reducing the engine power setting in order to prevent harm to the engine, the ECU, does not automatically reduce the power setting of the engine if Hc<H(min) wherein H(min) is a minimum cruising HAT value for the aircraft.

2. The system of claim 1 wherein the ECU comprises a processor and memory for comparing Hc received from the GPU with H(min) stored in the memory and thereby determining if Hc<H(min).

3. The system of claim 1, wherein the ECU controls operation of the engine in response to Hc and the engine operating values not due to an emergency condition or in landing, but during routine aircraft operation.

4. The system of claim 1, wherein the out-of-range operating condition comprises a temperature of the engine that has exceeded a predetermined threshold.

5. The system of claim 1, wherein the ECU increases a maximum allowable temperature for the engine during flight.

6. The system of claim 1, wherein the ECU prevents the aircraft from drifting within a predetermined height above an elevation of a feature of the terrain during a cruise portion of flight.

7. The system of claim 1, wherein, when the one or more sensors detects an out-of-range operating condition of the engine during a non-landing portion of flight, which out-of-range operating condition of the engine is normally curable by reducing the engine power setting in order to prevent harm to the engine, the ECU, during the non-landing portion of flight, does not automatically reduce the power setting of the engine if Hc<H(min) wherein H(min) is a current minimum HAT value for the aircraft.

8. The system of claim 1, wherein the ECU controls operation of the engine in response to Hc and the engine operating values during a non-landing portion of flight.

9. A system for controlling the power setting of an aircraft engine, comprising:
    a ground proximity unit (GPU) for measuring a height of the aircraft above a terrain;
    one or more sensors coupled to the engine for detecting a temperature of the engine; and
    an engine control unit (ECU) coupled to the GPU, the one or more sensors and the engine for controlling operation of the engine in response to the height and the temperature of the engine; and
    wherein, when the temperature of the engine exceeds a predetermined threshold, representing an out-of-range operating condition of the engine that is normally curable by reducing the engine power setting in order to prevent harm to the engine, the ECU, does not automatically reduce the power setting of the engine if the height drifts below a predetermined threshold, wherein the predetermined threshold comprises a cruising altitude for the aircraft.

10. The system of claim 9, wherein the ECU increases a maximum allowable temperature for the engine during flight.

11. The system of claim 9, wherein the ECU controls operation of the engine in response to the height and the temperature of the engine not due to an emergency condition or in landing, but rather during routine aircraft operation.

12. The system of claim 9, wherein the height comprises a height of the aircraft above an elevation of a feature of the terrain represented in an electronic map.

13. The system of claim 9, wherein, when the temperature of the engine exceeds the predetermined threshold during a non take-off, non-landing portion of the flight, representing an out-of-range operating condition of the engine that is normally curable by reducing the engine power setting during the non take-off, non-landing portion of the flight in order to prevent harm to the engine, the ECU does not automatically reduce the power setting of the engine if the height drifts below a predetermined threshold.

14. The system of claim 9, wherein the ECU controls operation of the engine in response to the height and the temperature of the engine during a non-landing portion of flight.

* * * * *